US011839200B2

United States Patent
Klocke

(10) Patent No.: US 11,839,200 B2
(45) Date of Patent: Dec. 12, 2023

(54) WET/DRY FEEDER FOR SWINE

(71) Applicant: Dave Klocke, Templeton, IA (US)

(72) Inventor: Dave Klocke, Templeton, IA (US)

( * ) Notice: Subject to any disclaimer, the term of this patent is extended or adjusted under 35 U.S.C. 154(b) by 447 days.

(21) Appl. No.: 16/415,407

(22) Filed: May 17, 2019

(65) Prior Publication Data
US 2019/0350165 A1    Nov. 21, 2019

Related U.S. Application Data

(60) Provisional application No. 62/673,456, filed on May 18, 2018.

(51) Int. Cl.
*A01K 5/02*     (2006.01)
*A01K 5/01*     (2006.01)

(52) U.S. Cl.
CPC .......... *A01K 5/0241* (2013.01); *A01K 5/0233* (2013.01); *A01K 5/01* (2013.01)

(58) Field of Classification Search
CPC .......... A01K 5/02; A01K 5/01; A01K 5/0275; A01K 5/0225; A01K 5/0241; A01K 29/005; A01K 39/014; A01K 5/0233
See application file for complete search history.

(56) References Cited

U.S. PATENT DOCUMENTS

| | | |
|---|---|---|
| 1,346,784 A | 7/1920 | Hamilton |
| 1,390,412 A * | 9/1921 | Widhelm ............ A01K 5/0241 |
| | | 119/902 |
| 2,207,395 A | 7/1940 | Brown |
| 2,723,783 A | 11/1955 | Ewin |
| 4,270,489 A | 6/1981 | Joronen |
| 4,353,329 A | 10/1982 | Thibault |
| 4,479,456 A * | 10/1984 | Schweiger ............ A01K 7/06 |
| | | 119/51.5 |
| 4,582,023 A | 4/1986 | Zumbahlen et al. |
| 5,275,130 A * | 1/1994 | Muckler ............ A01K 5/0233 |
| | | 119/53.5 |
| 5,579,719 A | 12/1996 | Hoff et al. |
| 5,850,805 A * | 12/1998 | Kleinsasser ......... A01K 5/0241 |
| | | 119/53.5 |
| 5,911,195 A | 6/1999 | Tripp et al. |
| 10,588,293 B2 * | 3/2020 | Zimmerman ........... A01K 7/02 |
| 2004/0083980 A1 * | 5/2004 | Harding ............... A01K 5/0216 |
| | | 119/60 |
| 2010/0229799 A1 * | 9/2010 | Brehmer ............. A01K 5/0216 |
| | | 119/53.5 |

(Continued)

FOREIGN PATENT DOCUMENTS

| | | | |
|---|---|---|---|
| CN | 105613317 A | * | 6/2016 |
| CN | 112056224 A | * | 12/2020 |
| FR | 2563078 A1 | | 10/1985 |

(Continued)

*Primary Examiner* — Monica L Perry
*Assistant Examiner* — Brittany A Lowery
(74) *Attorney, Agent, or Firm* — McKee, Voorhees & Sease, PLC

(57) ABSTRACT

A hog or swine feeder includes one or more stations for serving a single hog at a time. Each station includes a bowl, with a feed dispenser above the bowl, and a water dispenser below the feed dispenser. The feed and the water dispensers are actuated by the hog on demand. A hopper in the feeder supplies dry feed to the feed dispenser. The hog can select dry feed, wet feed, or drinking water, as needed.

6 Claims, 5 Drawing Sheets

(56) References Cited

U.S. PATENT DOCUMENTS

2014/0283756 A1* 9/2014 Klocke ................ A01K 5/0233
119/503
2019/0335706 A1* 11/2019 Zimmerman ............ A01K 7/02

FOREIGN PATENT DOCUMENTS

JP        4228017 A    8/1992
JP     2004180543 A    7/2004

* cited by examiner

__US 11,839,200 B2__

WET/DRY FEEDER FOR SWINE

CROSS-REFERENCE TO RELATED APPLICATIONS

This application claims priority to Provisional Application U.S. Ser. No. 62/673,456, filed on May 18, 2018, which is herein incorporated by reference in its entirety.

FIELD OF THE INVENTION

The invention is directed toward a hog feeder having one or more feed stations, with each station being adapted for use by a single hog at a time. Each station includes a dry feed dispenser and a water dispenser, both of which are actuated by the hog, which can feed and/or drink from a bowl beneath the dispensers.

BACKGROUND OF THE INVENTION

Swine feeding is a science, with numerous options. One common option is a wet/dry feeder, which allows the animal to eat dry food or mix the dry food with water to form a gruel. Conventional dry feeders have a hopper which discharges dry feed onto a shelf, and then the animal can eat from the shelf or push the dry feed from the shelf into a shallow pan wherein water can be added by the hog pushing his/her snout against a water nipple located above or next to the feed pan.

One problem with conventional wet/dry feeders is that a control must be provided to allow an operator to adjust the amount of dry feed dispensed from the hopper. Periodic adjustments are required, which adds time and costs to the hog operation. Thus, the wet/dry feeder must be monitored daily to make sure that the hogs are not over dispensing feed, which goes to waste. Conventional wet/dry feeders also slow down the faster eating hogs, which can create aggression at the feeder. Also, conventional wet/dry feeders typically only use the water in the feeder to make gruel and not as the hog's only water source, so they have to leave to drink. Aggression occurs when they return to find their feeder being occupied by another hog. Another problem with conventional wet/dry feeders is the need for a separate watering trough for the animals, since the pan will not hold sufficient water for drinking.

Some wet and dry feeders also are a community style feeder which allows multiple hogs to feed simultaneously from the same shelves and pans, with access to the same nipple to dispense water, rather than having individual feeding and watering stations for each animal. This also leads to waste when too much feed or water is dispensed by one or more hogs.

Thus, there is a need for an improved wet/dry feeder which overcomes the problem of the prior art.

Accordingly, a primary objective of the present invention is a provision of a wet/dry feeder with a feeding and drinking station to serve one hog at a time.

Another objective of the present invention is a provision of a wet/dry feeder which trains the hogs to dispense only the necessary feed and water, and to clean their own bowl by learning to not over-dispense the feed so they can drink out of the bowl.

A further objective of the present invention is a provision of a wet/dry feeder for swine which provides for ad-lib feed and water dispensing in a single bowl, without a dry feed shelf and without a separate drinking water bowl.

Still another objective of the present invention is a provision of a swine wet/dry feeder which eliminates the need for manual adjustment.

Yet another objective of the present invention is the provision of a hog feeder having multiple stations, each designed to feed and water a single hog at a time.

Another objective of the present invention is the provision of a hog feeder which dispenses dry feed and water directly into a bowl, such that a hog can select between dry feed, wet feed, and drinking water in the bowl.

Another objective of the present invention is the provision of a swine feeder having a rotary plug for actuation by the hog to dispense dry feed from a hopper into a bowl on an as needed basis.

A further objective of the present invention is the provision of a swine feeder which dispenses both feed and water and discourages the animal from over-dispensing dry feed to the exclusion of water.

Yet another objective of the present invention is the provision of a swine feeder which allows the swine to dispense feed and/or water for eating and/or drinking from a common feed and water bowl.

Another objective of the present invention is a provision of a wet/dry hog feeder which is economical to manufacture, and which is safe and durable in use.

These and other objectives will become apparent from the following description of the invention.

DETAILED DESCRIPTION OF THE INVENTION

Figure 1:
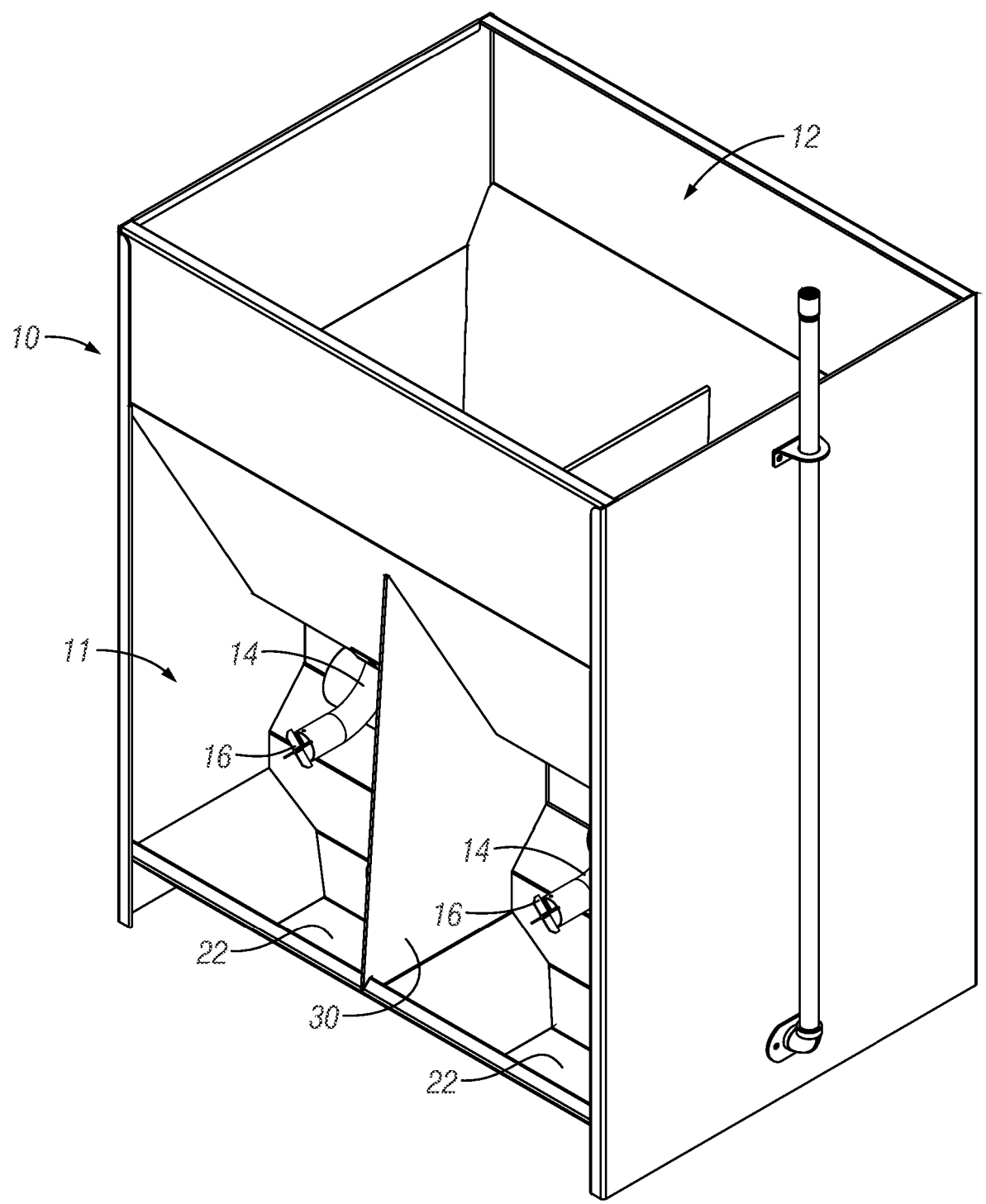
FIG. 1 is a perspective view of the wet/dry swine feeder according to the present invention.
Figure 2:
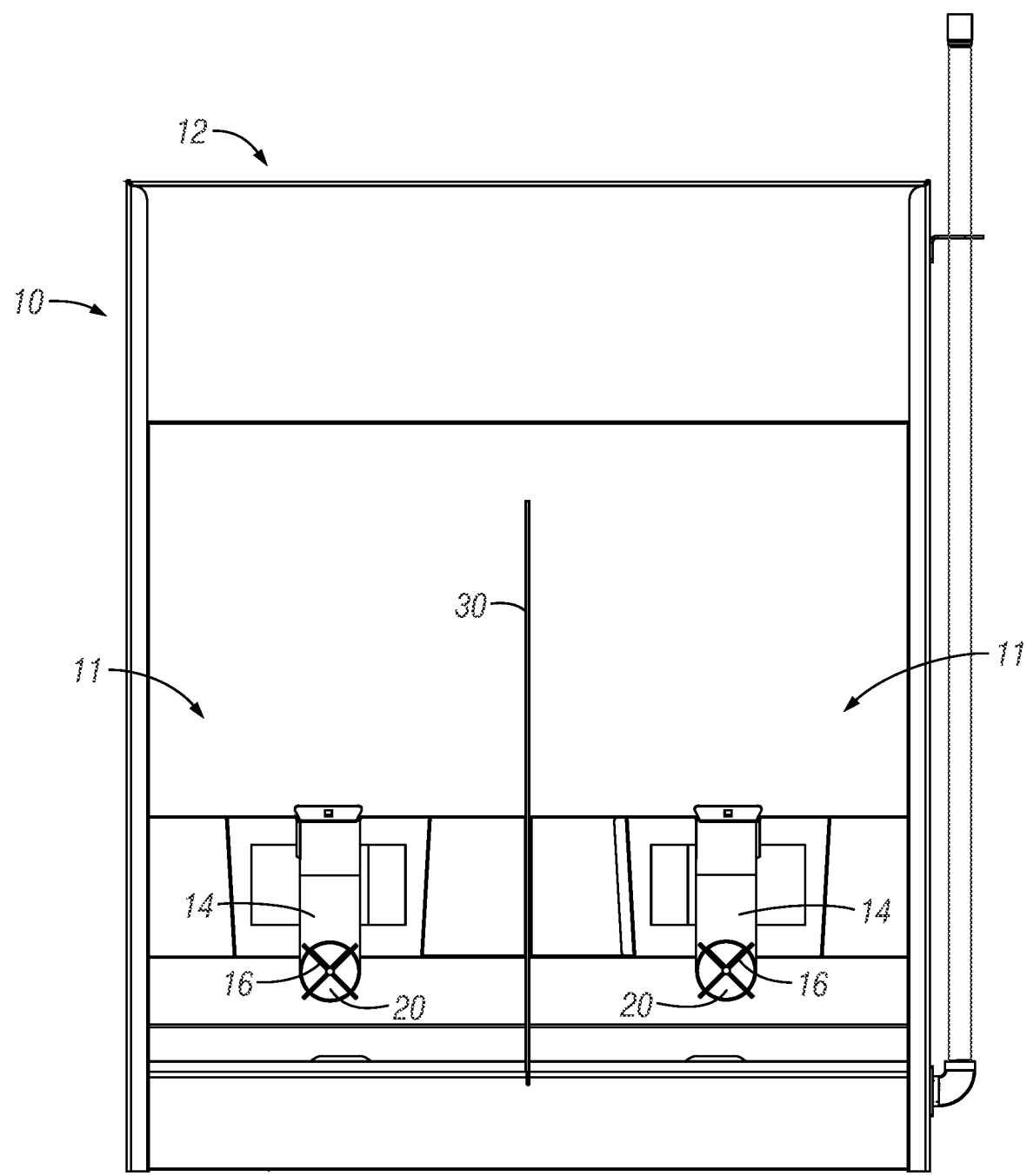
FIG. 2 is a front elevation view of the feeder shown in FIG. 1, with the front panel moved for clarity.
Figure 3:
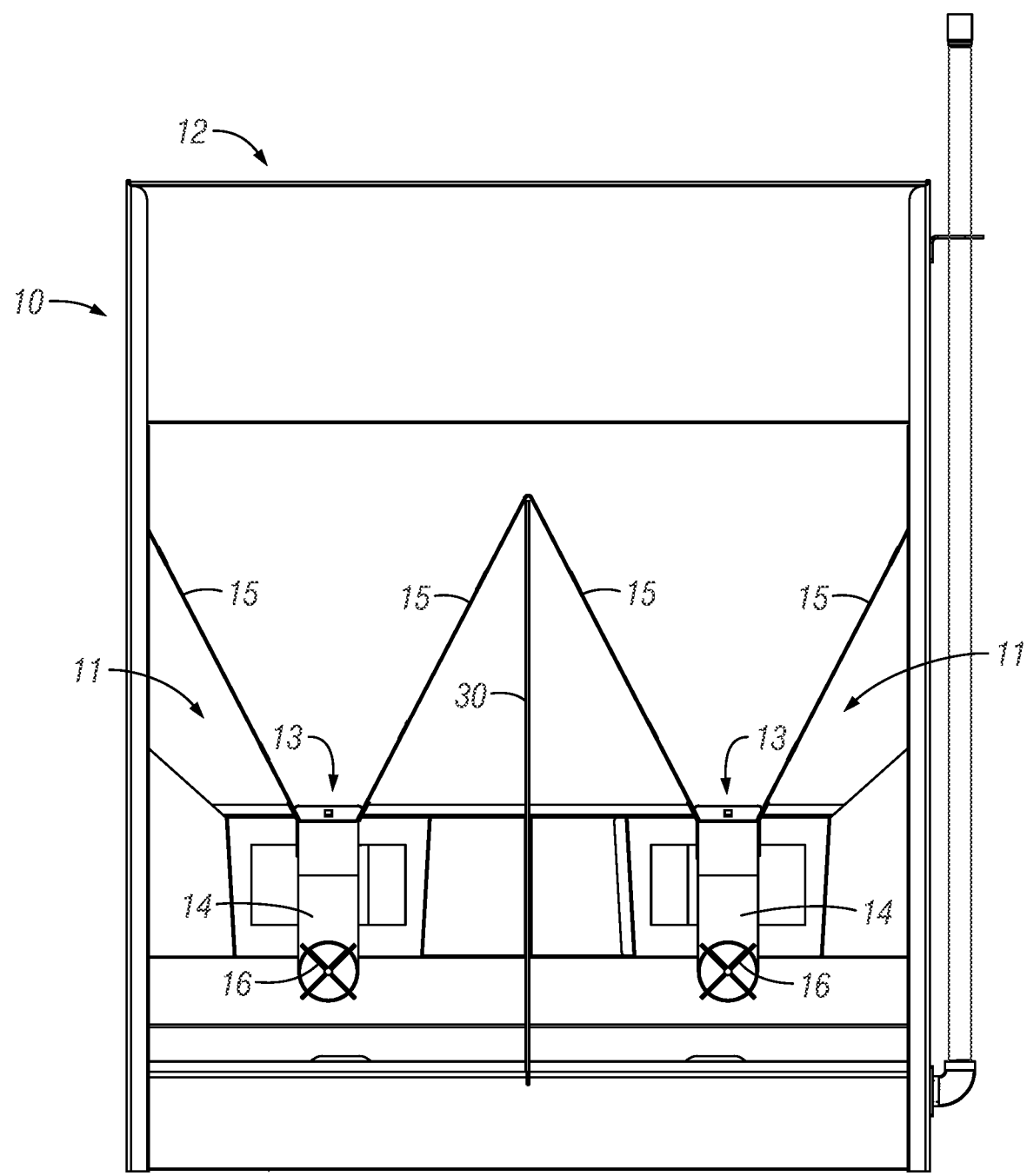
FIG. 3 is a front elevation view of the feeder shown in FIG. 1.
Figure 4:
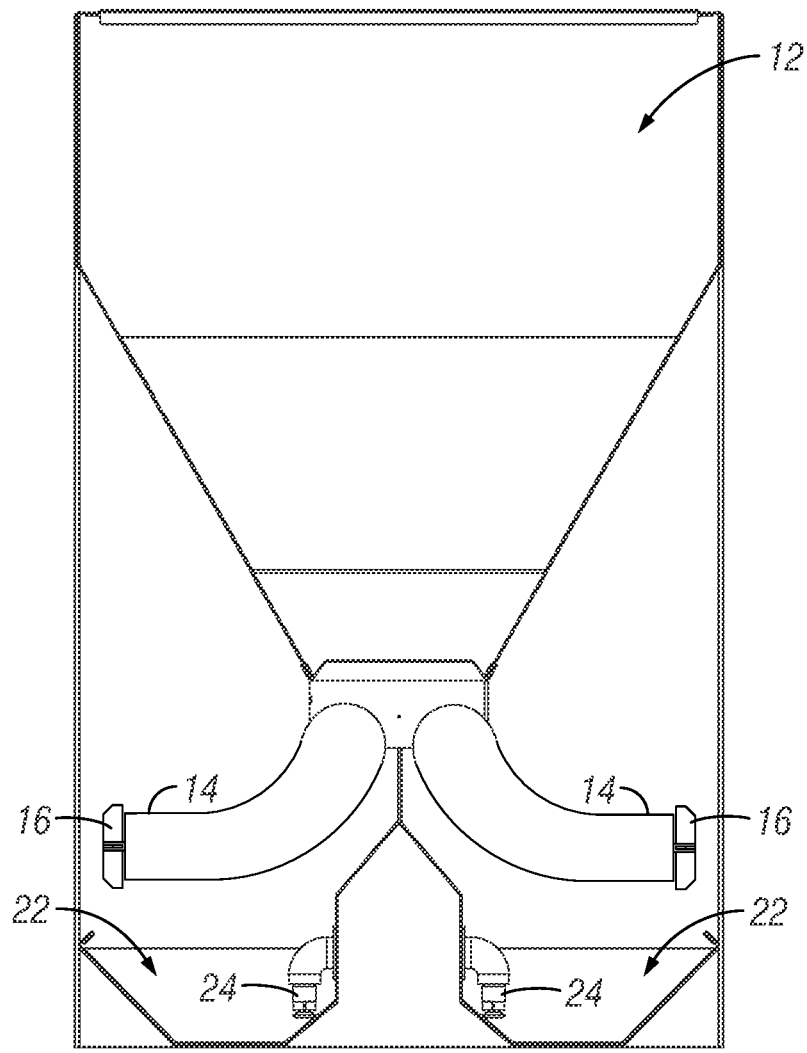
FIG. 4 is a sectional view taken along lines A-A of FIG. 3.

The swine wet/dry feeder of the present invention may be used for swine at any stage of development and is particularly adapted for use with gilts and is particularly adapted for use with gilts being held prior to breeding. The feeder 10 includes multiple feeding stations 11, with each station 11 being adapted to feed one animal at a time. For example, in the feeder 10 shown in the drawings, a total of four feeding stations 11 are provided, with two stations 11 on the front side and two stations 11 on the back side. It is understood that more or less feeding stations 11 may be provided on the feeder 10.

The feeder 10 includes a hopper or storage compartment 12 adapted to receive dry feed. The hopper 12 includes a discharge opening 13 for each feeding station 11, with sloped or funnel-shaped walls 15 directing feed to the respective outlets. A gate or dispensement mechanism 14 is provided on each outlet. In a preferred embodiment, the dispenser 14 is in the form of a rotatable plug with exterior vanes 16, such is that described in Applicant's U.S. Pat. No. 9,220,236, which is incorporated herein by reference. The dispenser or gate 14 creates a self-feeder with ad lib actuation by a hog at feeding time. The dispenser 14 includes a discharge opening 20 which allows dry feed to drop into a bowl or reservoir 22 when the swine rotates the vanes 16. The dispenser 14 may include an actuator extending upwardly beyond the hopper outlet to stir the dry feed and thereby prevent bridging of the feed above the dispenser 14.

The bowl 22 of each feeding station 11 is relatively deep. The feed drops directly into the bowl, without an intermediate shelf. Each feeding station 11 has a water nipple 24 with the nipple 24 being operatively connected to a water line 26. A hog can actuate the nipple 24 at only its own feeding station 11 to add water to the bowl 22. The nipple 24 extends below the top of the bowl, such that the hog quickly learns to avoid dispensing too much dry feed via the dispenser 14 which would fill the bowl 22 to a level above the nipple 24, and thus preclude actuation of the nipple. The nipple 24 is positioned low so that its mouth is near the floor of the pan 22 and is activated with the top of snout so the hog can dispense water and drink at the same time.

Also, the position of the nipple 24 inside the bowl 22 trains the hog to clean their food completely from their feeding station 11, such that the bowl 22 can also be used as a drinking bowl upon actuation of the water nipple 24 after the feed has been consumed.

The feeder 10 also includes a first wall 28 which divides the front and back feeding stations 11, and a second wall 30 that divides the side-by-side stations 11.

Thus, the self-feeding ad lib feeder of the present invention can be used from wean to finish by individual animals at a feeding station 11 who can selectively dispense dry feed to a bowl and selectively add water to the bowl to form gruel, and when the gruel is gone, used a bowl for drinking water. The feeder 10 enhances animal growth, minimizes or eliminates waste, reduces aggression between hogs within the pen by allowing each individual hog to eat as quickly or slowly as they desire, (There is no gate adjustment that might slow down the fast eating hogs) and avoids the need for periodic adjustments by an operator.

Figure 5:
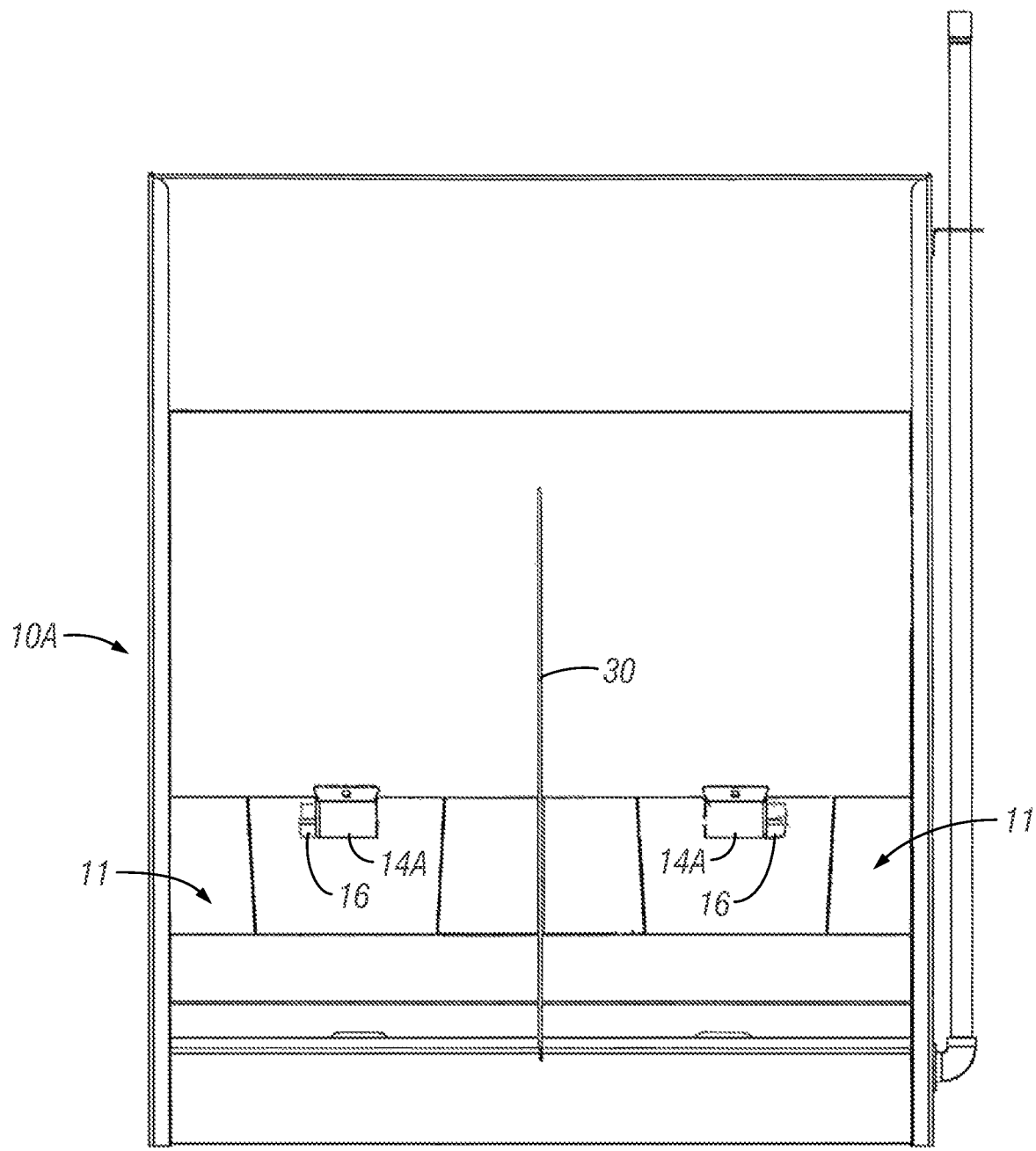
FIG. 5 is a front elevation view of an alternative embodiment, with the feed discharge oriented in a lateral direction.

FIG. 5 shows an alternative embodiment of the feeder 10A, which is similar to the feeder 10, except that the feed dispenser 14A is oriented laterally and approximately horizontally, substantially 90 degrees from the forwardly directed dispenser 14 shown in FIG. 1. The dispenser 14A is structurally and functionally similarly to the dispenser 14, with the rotatable plug and vanes 16 being actuated by the hog for on demand dispensing of feed into the bowl 22.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. A hog feeder, comprising:
   a hopper for holding dry feed;
   a pair of front and rear bowls beneath the hopper, and each bowl having a floor, front and rear walls, and opposite side walls, with the front, rear and sidewalls all being tapered inwardly and downwardly toward the floor;
   each bowl being sized for use by only one hog at a time;
   a pair of hog-actuated, front and rear feed dispensers in communication with the hopper and positioned in the front and rear bowls, respectively, and each front and rear feed dispenser being adapted to drop dry feed directly into only the front and rear bowls, respectively, and only upon actuation of one of the feed dispensers by a hog, and without an intervening shelf between the dispenser and the bowls;
   a pair of hog-actuated front and rear water dispensers, each being associated with the front and rear bowls, respectively, and each having a nipple adjacent one of the bowls to supply water to only the associated bowl; and
   the bowls, the feed dispensers, and the water dispensers creating a pair of front and rear feeding and drinking stations each being accessible by only one hog at a time, and the stations being isolated from one another with respect to receipt of feed and water;
   the front and rear feed and water dispensers providing feed and water only to the associated front and rear feeding and drinking stations, respectively, without disabling the other of the front and rear feeding and drinking stations;
   the feed dispensers dispenses a desired amount of feed without manual adjustment; and
   the feed and water dispensers can be sequentially actuated by the one hog on an ad lib basis to supply both feed and water into the bowl to create a gruel mixture.

2. The hog feeder of claim 1 wherein the bowl has a top edge and the nipple is positioned near the bottom of the bowl.

3. The hog feeder of claim 1 wherein the nipple is adjacent a bottom portion of the bowl so that water can be dispensed into the bowl while the hog drinks from the bowl.

4. The hog feeder of claim 1 wherein the feed dispenser is positioned forwardly of the water dispenser.

5. The hog feeder of claim 1 wherein the feed dispenser extends forwardly from the hopper to dispense feed into the bowl.

6. The hog feeder of claim 1 wherein the feed dispenser has a rotating member for actuation by the pig, and the rotating member having a non-vertical axis of rotation.

* * * * *